Aug. 7, 1956  J. M. JOHNSON  2,757,705
PORTABLE MANUALLY OPERABLE TOOL FOR RESTORING DAMAGED
VEHICLE BODIES OR FENDERS TO THEIR ORIGINAL SHAPES
Filed June 12, 1953  3 Sheets-Sheet 1
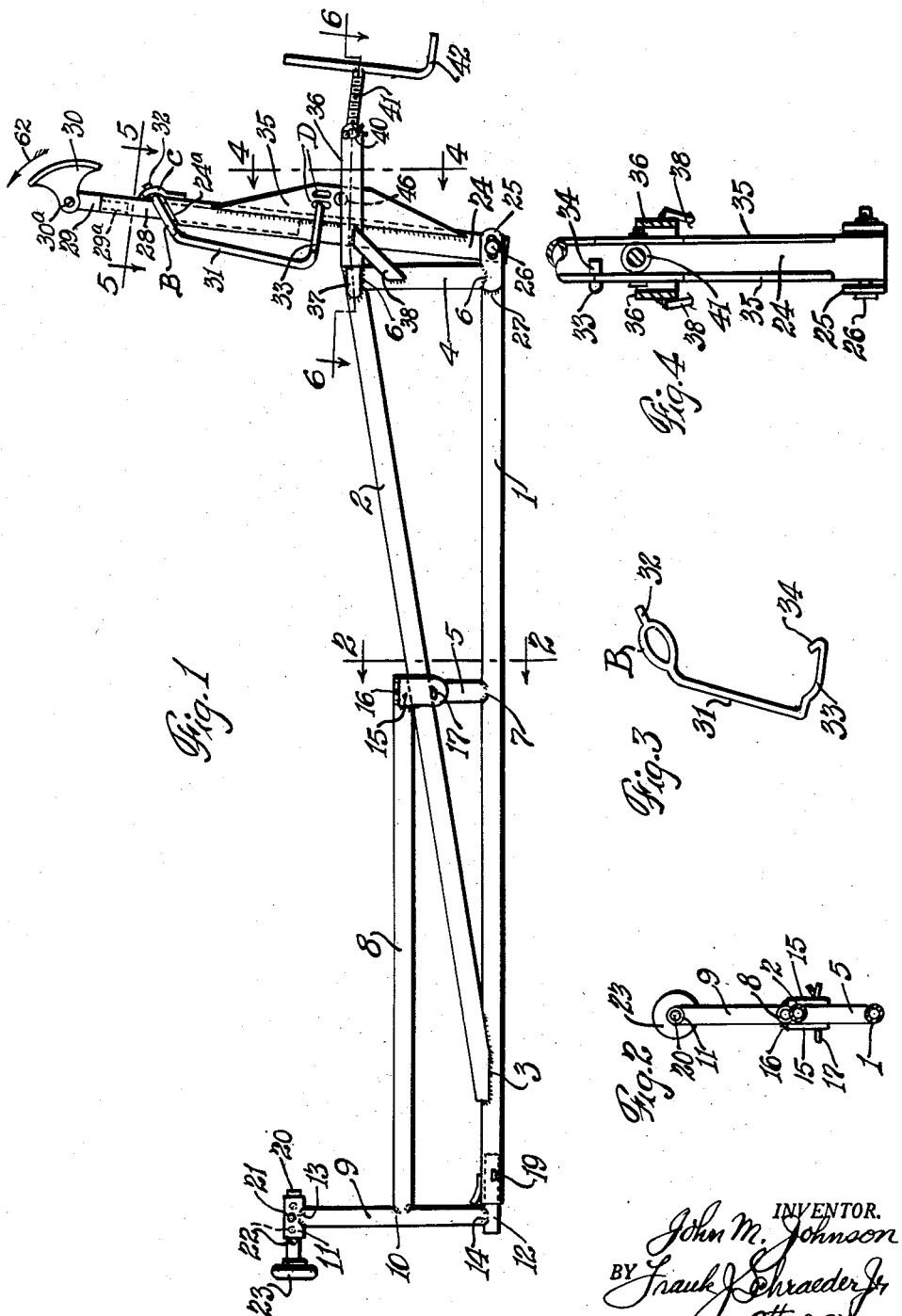
INVENTOR.
John M. Johnson
BY Frank J. Schraeder Jr.
Attorney

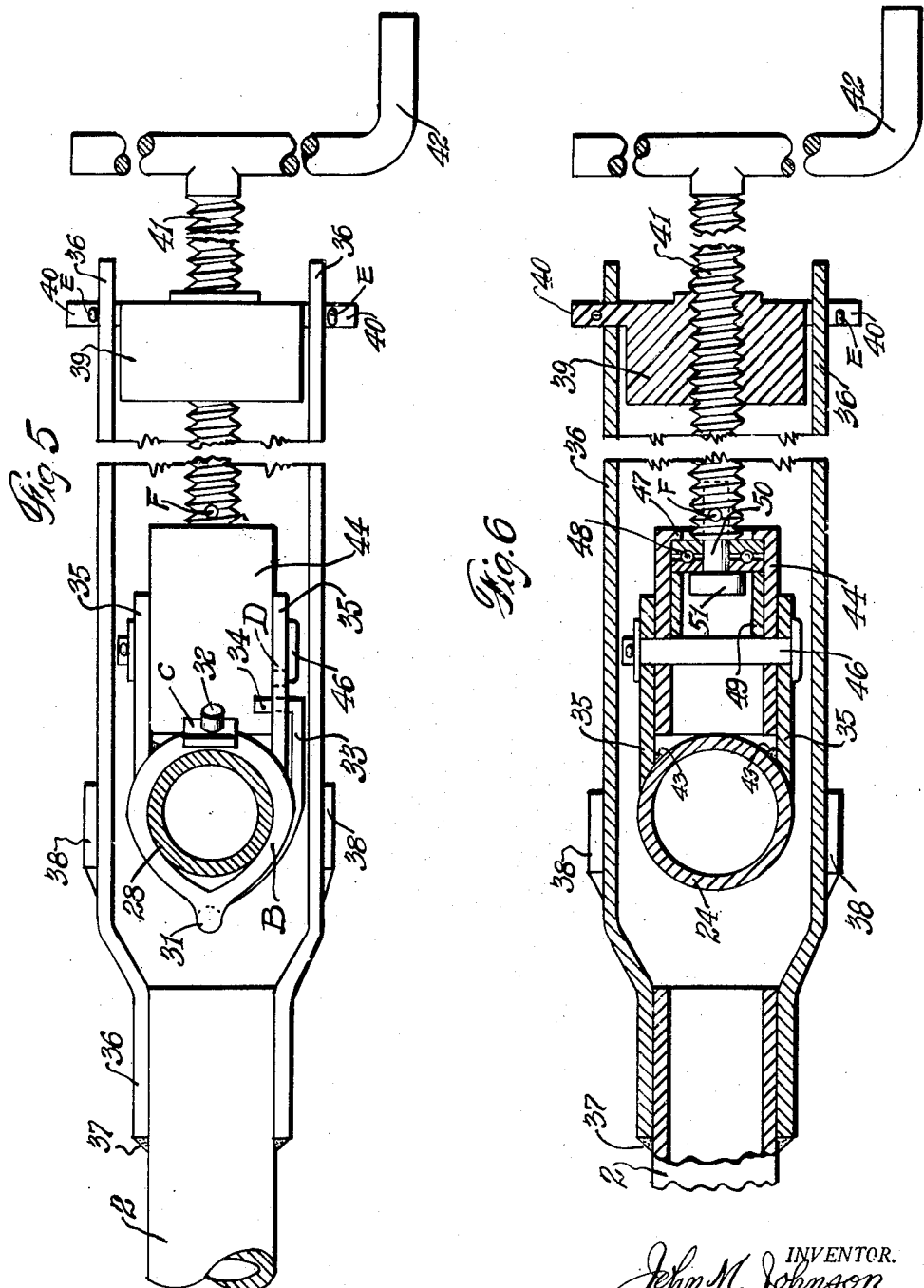

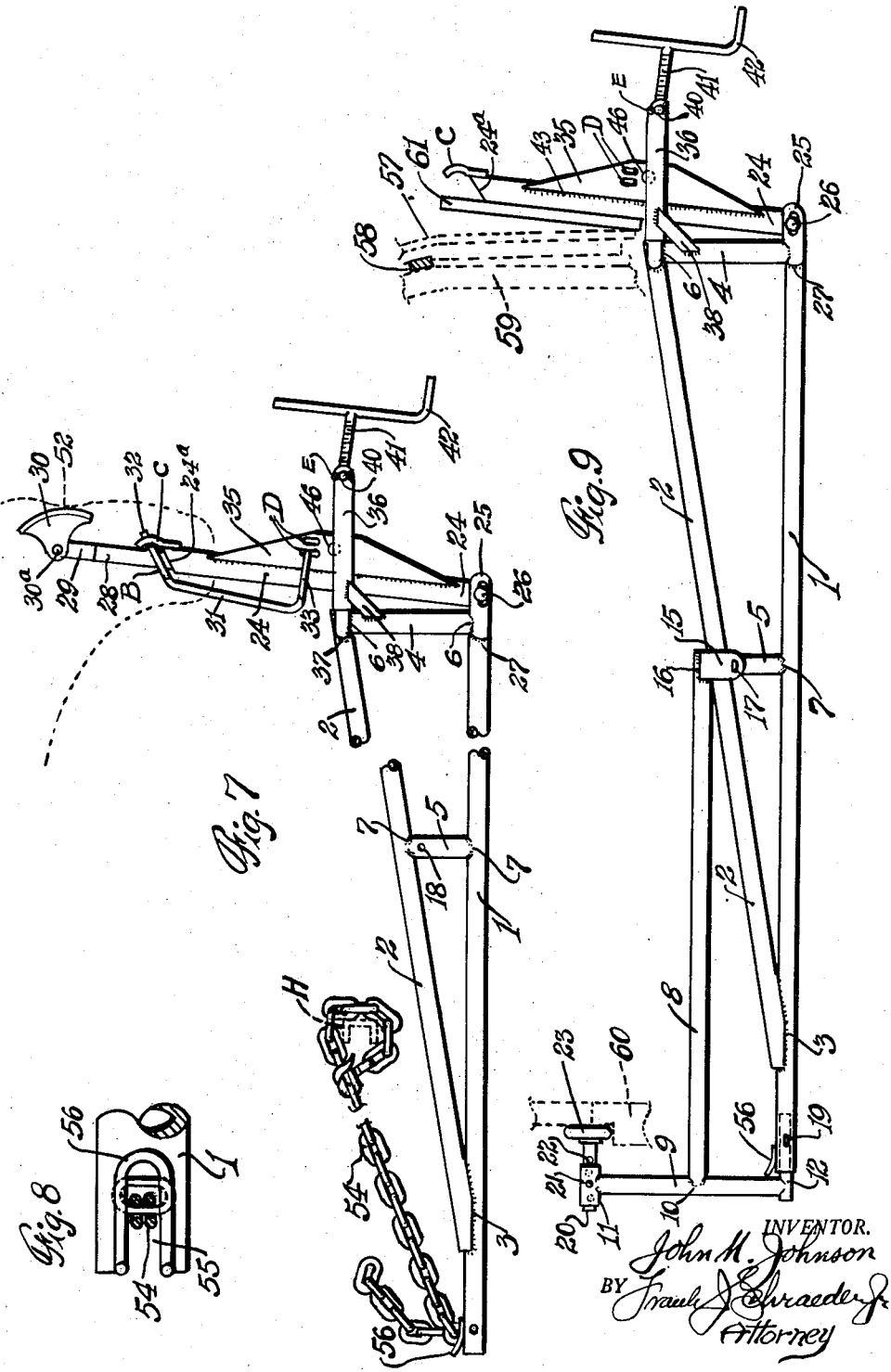

United States Patent Office 2,757,705
Patented Aug. 7, 1956

2,757,705

PORTABLE MANUALLY OPERABLE TOOL FOR RESTORING DAMAGED VEHICLE BODIES OR FENDERS TO THEIR ORIGINAL SHAPES

John M. Johnson, Lindsborg, Kans.

Application June 12, 1953, Serial No. 361,143

3 Claims. (Cl. 153—39)

This invention relates to a portable manually operable tool for restoring damaged vehicle bodies or fenders to their original shapes, and more particularly to improvements of the tool disclosed in No. 2,597,103 issued jointly to John M. Johnson and Bernard P. Leaf, on May 20, 1952.

A principal object of this invention is to provide a mechanical tool for straightening frame, body and fender components of automotive vehicles by the application of an expansible and a compressible force, selectively, upon deformed components as the case requires for restoring original shapes or positions to said components.

Another object of this invention is to provide a portable mechanism adaptable to body or fender work in congested places and adapted to impart two opposed forces at spaced points either force capable of being retained against movement, while the other force exerts a pulling or pushing pressure upon a component, or upon spaced components, as the particular case may require, for the restoration of such component or components to original shape or position.

Another object of this invention is to provide a unitary, portable mechanism that may be easily actuated and readily applied for various restoring applications of bent or damaged vehicle components.

The various features of novelty whereby the present invention is characterized will hereinafter be pointed out with particularity in the appended claims, but, for a full understanding of the invention and of its objects and advantages, reference may be had to the following detailed description taken in connection with the accompanying drawings, in which like reference characters designate like or corresponding parts or members and wherein:

Fig. 1 is a side elevation of the mechanical tool embodying my invention.

Fig. 2 is a sectional view taken on line 2—2 in Fig. 1.

Fig. 3 is a perspective view of a retainer for frictionally retaining an extensible member in selected adjusted position.

Fig. 4 is a fragmentary and enlarged sectional view, taken on line 4—4 in Fig. 1.

Fig. 5 is an enlarged view taken on line 5—5 in Fig. 1, parts being broken away for convenience of illustration.

Fig. 6 is an enlarged cross sectional view taken on line 6—6 in Fig. 1, parts being broken away for convenience of illustration.

Fig. 7 is a side elevation of the mechanism, showing one application of same upon a dented fender, parts being broken away for convenience of illustration.

Fig. 8 is an enlarged plan view of an end portion of Fig. 7, illustrating the anchoring of a chain thereto.

Fig. 9 is a side elevation of the mechanism, showing another application thereof as applied to a vehicle body for correction of a door sprung at its lower extremity.

Referring particularly to Figs. 1 to 6 inclusive the invention comprises a main frame consisting of an elongated base member 1 and a diagonally positioned brace 2. One end of the brace 2 is secured to the base member 1 a spaced distance from one end of member 1 by welding, as at 3, and other corresponding ends of member 1 and brace 2 are secured in spaced relation by an interconnecting strut 4 and a transverse tie 5 joined to member 1 and brace 2 intermediately of their ends, both strut 4 and tie 5 being secured by welding, as at 6 and 7, respectively.

Removably secured to the main frame is an auxiliary T-shaped frame comprising an arm 8 and a transverse anchor element 9 joined to one end of the arm 8 medially the ends of the element 9 by welding, as at 10. On opposite ends of the anchor element 9 are secured their respective sleeves 11 and 12 by welding, as at 13 and 14, respectively, said sleeves 11 and 12 being transversely positioned with respect to the anchor element 9 for the purpose later described.

Secured to the other end of the arm 8 of the auxiliary frame by welding as at 16, is a pair of parallel depending and relatively spaced ears 15 which ears 15 embrace therebetween the brace 2 and are detachably secured thereto by a suitable removable pin 17 extending through said ears 15 and apertures in the wall of the tubular cross tie 5 to thereby provide removable securing means for the arm 8 to the main frame. The outer end of the auxiliary frame has one end of its sleeve 12 extending a predetermined distance into an end of the base member 1 and is secured therein by a suitable removable pin 19 extending through apertures in the tubular base member 1 and through the sleeve 12. The auxiliary frame when installed, as above stated, will position the arm 8 in parallelism with the base member 1, serving as supporting means for the anchor element 9.

It will be understood that the main and auxiliary frames are made from tubing material, suitably joined, and preferably welded as illustrated in the drawings.

Secured in the sleeve 11 of the anchor element 9 is a dolly consisting of a stem 20 telescopically and adjustably mounted within the sleeve 11 and secured therein in adjusted position by a cotter pin 21 extending through the sleeve 11 and selectively through one of a plurality of apertures 22 in the stem 20. Suitably attached to the stem 20 is a circular shoe or pad 23, preferably of rubber or other non-abrasive material, that functions as the engaging medium to contact deformed or distorted parts of a vehicle fender or body when the mechanism as a whole is being used to provide a pulling or pushing force on distorted components of a vehicle to restore the shape of same.

Pivotally connected to an outer end of the main frame is another dolly structure consisting of a tubular arm 24 pivotally supported between a pair of spaced ears 25 through the medium of a trunnion pin 26 seated in slotted openings in said ears 25 that are welded to the base member 1, as at 27. Telescopically mounted in the tubular arm 24 is an extensible tubular dolly arm 28 the outer end of which is adapted to telescopically receive therein the diametrically reduced short inner end 29a of the shank 29 of a rockable arcuate shoe 30, said shoe 30 functioning as the contact medium for exerting pressure upon a deformed component when the mechanism is in use. To retain the extensible dolly arm 28 in adjusted position in arm 24, there is provided an elongated bar retainer 31 having an integral oval-shaped loop B disposed angularly to the bar 31 and substantially parallel to the angular edge 24a of the adjacent end of the tubular arm 24; this loop B functioning to frictionally engage and bind the arm 28 when the retainer is installed as shown in Fig. 1. The loop B has an integral protrusion 32 extending outwardly therefrom to engage within a hole in the free end of a lip C one end of which is welded just below the angular edge of the free end of the arm 24. The retainer 31 prior to installation is slightly expanded between its end portions B and 33 but is sprung inwardly when installed with its loop B around the upper end of arm 24 by gripping the same adjacent the bent end portion 33 and manually slightly bending same until the hook 34 thereof engages within one of the elongated slots D of a web 35, selectively, by which means, the loop B binds itself to the extension arm 28 adjacent the lip C.

The means for controlling the rocking of the arm 24 is now described, enlarged views thereof being illustrated in Figs. 5 and 6. Extending from the end of the brace 2 adjacent the rockable arm 24 is a pair of supporting bars 36 transversely positioned with respect to the arm 24, said bars 36 being spaced apart to receive the arm 24 rockably therebetween. The two corresponding reenforcing bars 36 are joined to the said brace 2 as by welding, as at 37, and each is further supported by a brace 38 welded to the strut 4 and to the bars 36. Referring to Figs. 5 and 6, the other corresponding ends of the bars 36 have pivotally supported therebetween an internally threaded nut 39, said nut having trunnions 40 oppositely extending to engage within openings in their respective supporting bars 36, there being cotter pins E to retain the nut 39 against displacement from the bars 36. Threadedly engaging in the nut 39 is an operating screw 41, the outer end of which has secured thereto a crank 42.

Spaced apart and welded to the arm 24, as at 43, is a pair of elongated ribs or webs 35 which serve as reinforcing means therefor. Pivotally supported on pin 46 between the webs 35 is a sleeve 44 which is provided at its outer end with an inwardly extending flange 47 that serves as retaining means for the outer side of a ball bearing 48 in conjunction with a tubular retainer 49 securely positioned between the inner side of bearing 48 and pin 46 as shown in Fig. 6. The screw 41 is rotatably positioned in the bearing 48 and prevented from displacement therefrom by a bolt 50 having a head 51, said bolt 50 extending a short distance into an axial bore within the inner end of the screw 41 and retained therein by a pin F. By rotation of the crank 42, selectively, the screw 41 and headed bolt 50 will exert thrust upon the ball bearing 48 as the screw 41 is moved inwardly and outwardly, respectively, which in turn will affect an inward or outward movement of the dolly shoe 30 relatively to the dolly shoe 23.

The mechanism operates as follows: When it is desired to exert outward force, the device as shown in Fig. 1 may be employed, in which case, the dolly shoe 23 is positioned in contact with a solid structure to retain the frames against longitudinal movement while the dolly shoe 30 is caused to be moved outwardly by turning the crank 42, thus applying pressure upon an inner side of a dented portion of a damaged fender, similarly as illustrated in Fig. 7. By turning the dolly shoe 30 about its pivot pin 30a inwardly, in the direction indicated by arrow 62 in Fig. 1, and reversing the dolly shoe 23 to an inwardly facing position as illustrated in Fig. 9, the dollies exert forces inwardly toward each other for compression of work.

Fig. 7 illustrates the method of removing a dented portion 52 in a vehicle fender 53, said fender being fragmentarily diagrammatically shown on dotted lines. In this application, the auxiliary T-shaped frame is removed and is substituted by a chain 54 as anchoring means for the main frame during the pressure of the dolly shoe 30 upon the inner face of the dented portion of said fender 53. One end of the chain 54 is suitably attached to a rigid member of the vehicle chassis such as a channel H shown by broken lines, while the other end portion of the chain 54 is secured to the free end of the base member 1 by inserting a link of said chain inwardly of a notch 55 that is provided in the free end of base member 1. The peripheral edge of the notch 55 is reinforced by a U-shaped element 56 as shown in Fig. 8. The attachment of the chain 54 to the base member 1 may be varied from that described and shown without affecting the working capacity of the mechanism.

Fig. 9 illustrates the application for the correction of a vehicle door 57 that is sprung outwardly at its lower extremity. To spring the door inwardly, a wedge 58 is placed between the door 57 and its adjacent body structure 59 a spaced distance upwardly from the lower end portion of the door 57, said door and body being diagrammatically shown by broken lines. The dolly shoe 23 is placed against the opposite side of the vehicle as illustrated by broken lines 60 to retain the frames in applied positions. In this application, the dolly shoe 30 and its extension arm 28 are removed and substituted by a suitable wood strip 61 to bear and transmit its thrust upon the lower end portion of the door 57 as force upon said wood strip 61 is applied through the inward movement of the pivotally supported arm 24 by the rotation of screw handle 42.

While the drawings illustrate only two applications of the mechanism, it will be understood that many other applications may be accomplished thereby, and, furthermore, dolly shoes having shapes other than those shown in Fig. 1 may be substituted therefor. Obviously, various attachments or working tools may be employed as substitutes for the dolly shoes shown and described.

The embodiment shown in the drawings and described in the specification is preferably the desired structure at this time, however minor changes in construction and proportion may be employed without departing from the spirit of my invention, and other modifications may be made as lie within the scope of the appended claims.

I claim:

1. An automobile body and fender straightening tool comprising: a pair of spaced dollies one of said dollies being adapted to being moved toward and from the other of said dollies and each carrying a pressure-exerting shoe, a main frame of appreciable length connecting said dollies, said main frame having removably secured thereto a second auxiliary T-shaped frame having a transverse element extending from one end of said main frame at right angle thereto and having an arm rigidly connected at one end with said transverse element and its opposite end detachably connected to said main frame, means on the free end of said transverse element for adjustably carrying one of said pressure-exerting shoes, a pair of spaced ears and a pair of spaced bars secured to the opposite end of said main frame in spaced relation from each other, a first tubular arm extending between said pair of bars and having one end pivotally connected to said ears, a second extensible tubular arm telescopically carried in the opposite end of said first tubular arm, frictional means for adjustably securing said second extensible arm in said first tubular arm, the other one of said pressure-exerting shoes being adjustably carried in the free end of said second extensible arm, and means for adjustably moving said first tubular arm together with said second extensible tubular arm toward and from said pressure-exerting shoe on said transverse element of said T-shaped frame comprising a pair of spaced ribs secured to said first tubular arm, a sleeve pivotally carried on and between said ribs, an antifriction bearing carried in said sleeve, an internally threaded nut pivotally carried on and between said pair of bars, a screw extending through said nut and having its inner end rotatably fixed in said bearing, and a handle fixed to the outer end of said screw for rotating said screw to thereby selectively move said first tubular arm and the pressure-exerting shoe carried on its extensible arm toward or from the other pressure-exerting shoe.

2. In a vehicle body and fender straightening tool, a rigid triangular-shaped main frame consisting of members together forming the base, altitude and hypotenuse of substantially a right triangle, an auxiliary T-shaped frame removably secured to said main frame consisting of an elongated arm constituting the stem portion of said T-shaped frame joined at one end to the medial portion of a transverse member constituting the cross portion of said T-shaped frame, said elongated arm being detachably secured at its opposite end to said hypotenuse member of said main frame, one end of said transverse cross member being detachably secured to one end of said base member, a sleeve extending transversely of and secured to the other end of said transverse cross member, a work-engaging shoe having a stem adapted to be adjustably selectively inserted alternately into opposite ends of said sleeve and detachably secured therein to thereby present the work-engaging side of said shoe in either one of two opposite directions, a pair of transversely spaced parallel bars extending laterally from the junction of said altitude and hypotenuse members outwardly beyond said main frame and normal to said altitude member, an oscillatable arm extending between said bars and pivotally mounted at one end thereof to the opposite end of said base member, and screw-actuated means pivotally supported at the outer end of and between said parallel bars and pivotally connected to an intermediate portion of said oscillatable arm for moving said oscillatable arm selectively toward or from said shoe on said T-shaped frame.

3. In a vehicle body and fender straightening tool as set forth in claim 2 wherein said oscillatable arm is tubular and including a tubular extension telescopically mounted within the free end of said oscillatable arm, a second shoe pivotally carried on the outer end of said extension adapted to be alternately selectively positioned with its work-engaging side to face toward or away from said first-mentioned shoe on said T-shaped frame, and frictional means for securing said extension in selectively extended positions on said oscillatable arm.

References Cited in the file of this patent

UNITED STATES PATENTS

| | | |
|---|---|---|
| 1,721,723 | Weston | July 23, 1929 |
| 2,588,509 | Forster | Mar. 11, 1952 |
| 2,597,103 | Johnson et al. | Mar. 20, 1952 |
| 2,597,234 | Elam | May 20, 1952 |